(12) United States Patent
Park et al.

(10) Patent No.: US 9,048,493 B2
(45) Date of Patent: Jun. 2, 2015

(54) CATHODE ACTIVE MATERIAL, CATHODE INCLUDING THE CATHODE ACTIVE MATERIAL, AND LITHIUM BATTERY INCLUDING THE CATHODE

(75) Inventors: Kyu-sung Park, Suwon-si (KR); Dong-min Im, Seoul (KR)

(73) Assignee: SAMSUNG SDI CO., LTD., Suwon-si, Gyeonggi-do (KR)

( * ) Notice: Subject to any disclaimer, the term of this patent is extended or adjusted under 35 U.S.C. 154(b) by 940 days.

(21) Appl. No.: 12/630,906

(22) Filed: Dec. 4, 2009

(65) Prior Publication Data

US 2010/0143791 A1    Jun. 10, 2010

(30) Foreign Application Priority Data

Dec. 5, 2008   (KR) .................. 10-2008-0123152

(51) Int. Cl.
| | | |
|---|---|---|
| *H01M 2/02* | (2006.01) | |
| *H01M 4/00* | (2006.01) | |
| *H01M 4/485* | (2010.01) | |
| *H01M 4/505* | (2010.01) | |
| *H01M 4/48* | (2010.01) | |
| *H01M 4/525* | (2010.01) | |
| *C01G 23/00* | (2006.01) | |
| *H01M 4/131* | (2010.01) | |
| *H01M 4/36* | (2006.01) | |
| *H01M 4/62* | (2006.01) | |
| *H01M 10/052* | (2010.01) | |

(52) U.S. Cl.
CPC .............. *H01M 4/485* (2013.01); *H01M 4/505* (2013.01); *H01M 4/48* (2013.01); *H01M 4/525* (2013.01); *C01G 23/005* (2013.01); *C01P 2002/72* (2013.01); *C01P 2002/85* (2013.01); *C01P 2006/40* (2013.01); *H01M 4/131* (2013.01); *H01M 4/366* (2013.01); *H01M 4/62* (2013.01); *H01M 10/052* (2013.01); *Y02E 60/122* (2013.01)

(58) Field of Classification Search
CPC ....... H01M 4/48; H01M 4/485; H01M 4/505; H01M 4/525
USPC .................. 429/164, 220, 405, 484, 489, 523
See application file for complete search history.

(56) References Cited

U.S. PATENT DOCUMENTS

| | | | |
|---|---|---|---|
| 6,395,426 B1* | 5/2002 | Imachi et al. ............. 429/231.3 |
| 6,582,854 B1* | 6/2003 | Qi et al. .................... 429/231.95 |
| 2003/0072883 A1* | 4/2003 | Jahl et al. ................. 427/255.36 |
| 2004/0234853 A1* | 11/2004 | Adachi et al. ............. 429/231.1 |
| 2005/0181279 A1 | 8/2005 | Hosoya |
| 2007/0238023 A1* | 10/2007 | Gorshkov et al. .......... 429/231.1 |
| 2008/0032199 A1* | 2/2008 | Ohzuku et al. ............. 429/304 |
| 2008/0145758 A1* | 6/2008 | Kim et al. .................... 429/219 |
| 2008/0176142 A1* | 7/2008 | Inagaki et al. ............. 429/330 |
| 2008/0193834 A1* | 8/2008 | Murakami et al. .......... 429/129 |
| 2008/0268342 A1* | 10/2008 | Suzuki et al. ............. 429/231.5 |
| 2009/0208847 A1* | 8/2009 | Kang ........................ 429/231.5 |
| 2009/0214946 A1* | 8/2009 | Shen et al. .................... 429/176 |

FOREIGN PATENT DOCUMENTS

| | | |
|---|---|---|
| JP | 7-288124 | 10/1995 |
| JP | 2005-228706 A | 8/2005 |

OTHER PUBLICATIONS

English translation of Detailed description section of JP 07-288124.*
Snyder et al., "Synthesis and characterization of atomic layer deposited titanium nitride thin films on lithium titanate spinel powder as a lithium-ion battery anode", Journal of power sources, 2007, vol. 165, No. 1, pp. 379-385.*
Office Action mailed Feb. 27, 2015 in corresponding Korean Patent Application No. 10-2008-0123152.

* cited by examiner

*Primary Examiner* — Ladan Mohaddes
(74) *Attorney, Agent, or Firm* — Lee & Morse, P.C.

(57) ABSTRACT

A cathode active material, a cathode including the cathode active material, and a lithium battery including the cathode. The cathode active material includes a lithium composite oxide and a lithium titanium oxide, wherein the lithium titanium oxide includes titanium having an average oxidation number of 4-y (0<y<2). The lithium titanium oxide is reduced.

19 Claims, 7 Drawing Sheets

CATHODE ACTIVE MATERIAL, CATHODE INCLUDING THE CATHODE ACTIVE MATERIAL, AND LITHIUM BATTERY INCLUDING THE CATHODE

CROSS-REFERENCE TO RELATED APPLICATION

This application claims the benefit of Korean Patent Application No. 10-2008-0123152, filed on Dec. 5, 2008, in the Korean Intellectual Property Office, the disclosure of which is incorporated herein, by reference.

BACKGROUND

1. Field

The present teachings relate to a cathode active material, a cathode including the same, and a lithium battery including the cathode.

2. Description of the Related Art

Lithium batteries are used as power sources of portable electronic devices. Since lithium batteries use an organic electrolytic solution, the discharge voltage of lithium batteries is at least twice as high as that of conventional batteries using an aqueous alkali solution. Accordingly, lithium batteries have a higher energy density.

Lithium batteries use a cathode active material, such as a lithium composite oxide. Examples of the lithium composite oxide include $LiCoO_2$, $LiNiO_2$, $LiMn_2O_4$, and $LiMnO_2$. Among these lithium composite oxides, $LiCoO_2$ is the most commonly used cathode active material. However, $LiCoO_2$ is relatively expensive and has a limited electrical storage capacity. Also, when lithium batteries using $LiCoO_2$ are charged, Li is removed from $LiCoO_2$ and exists in a form of $Li_{1-x}CoO_2$, which is unstable and unsafe in lithium batteries.

To overcome this and/or other problems, many cathode active materials having different composition ratios, such as $LiNi_xCo_{1-x}O_2$ ($0 \leq x < 1$), or $LiNi_{1-x-y}Co_xMn_yO_2$ ($0 \leq x \leq 0.5$, $0 \leq y \leq 0.5$), have been developed. However, even with such cathode active materials, this problem has not been completely overcome.

Meanwhile, $xLi_2MO_{3-(1-x)}LiMeO_2$ ($0 < x < 1$, M and Me are metals) is a layered-structure solid solution including $Li_2MO_3$ and $LiMeO_2$, constituting a next-generation high-capacity cathode active material. In this case, when M of $Li_2MO_3$ is Mn, Mn does not contribute to an electrochemical reaction, because during charging, Mn already has an oxidation number of +4 and thus, cannot be further oxidized. However, during initial charging, lithium may be released, due to the oxidation of oxygen, and during discharging, lithium may react with Mn3+/4+, and thus, high capacity characteristics can be obtained. In this process, the crystal structure becomes unstablized. Thus, when charged and discharged with a high capacity, cycle-life characteristics are reduced. In addition, since high voltage cycling is performed to realize the high capacity, charge/discharge efficiency is lower than when conventional materials are used.

To overcome these problems, the performance of lithium composite oxides can be improved, or lithium composite oxides can be coated with, or used together with, other materials to improve battery characteristics. Specifically, when lithium composite oxides are coated with, or used together with, a non-transition metal based oxide, such as $Al_2O_3$, $MgO$, $SiO_2$, $CeO_2$, $ZrO_2$, or $ZnO$, a non-transition metal based phosphoric acid material, such as $AlPO_4$, or a non-transition metal based fluoride such as $AlF_3$, high-voltage stability is improved. However, these methods result in a decrease in electrical conductivity, or an insufficient charge/discharge efficiency.

SUMMARY

One or more embodiments include a cathode active material that has a high capacity, high electrical conductivity, and during high-voltage charging/discharging, a long cycle-life and a high charge/discharge efficiency.

One or more embodiments include a cathode including the cathode active material.

One or more embodiments include a lithium battery including the cathode.

To achieve the above and/or other aspects, one or more embodiments may include a cathode active material including: a lithium composite oxide represented by Formula 1; and a lithium titanium oxide represented by Formula 2, wherein the lithium titanium oxide comprises titanium having an average oxidation number of 4-w, where $0 < w < 2$:

$$Li_{1+x}M_yM'_{1-y}O_{2+z} \qquad \text{[Formula 1]}$$

where M is Mn, Zr, Ti, Mo, Zn, or a combination thereof; M' ir Ni, Co, Mn, Cr, Fe, V, Al, Mg, Ti, Mo, Cu, Zr, B, or a combination thereof; $-0.5 < x < 1$; $0 < y < 1$; and $0 < z < 1$; and $$Li_aTi_bMe_cO_d \qquad \text{[Formula 2]}$$

where Me is Al, Zr, Mg, Sn, Si, Ce, Zn, Mo or a combination thereof; $3 < a < 8$; $4 < b+c < 7$; $b \geq c$; $0 \leq c < 1$; and $11 < d < 13$.

The lithium titanium oxide may be heat-treated, under a reduction atmosphere. The reduction atmosphere may be selected from the group consisting of an $H_2$ atmosphere, an $H_2$-containing gaseous mixed atmosphere, and an $NH_3$ atmosphere.

The lithium titanium oxide may include titanium having a binding energy in a range of from about 456.00 to about 458.00 eV, wherein the binding energy is evaluated by an X-ray photoelectron spectroscopy (XPS) analysis.

Titanium nitride (TiN) or titanium oxynitride (TiON) may be formed on the surface of the lithium titanium oxide.

The titanium nitride (TiN) or titanium oxynitride (TiON) may have a binding energy in a range of about 455.00 to about 458.00 eV, wherein the binding energy is evaluated by an XPS analysis.

The cathode active material includes from about 95 weight % to about 99.9 weight % of the lithium composite oxide and from about 0.1 to about 5 weight % of the lithium titanium oxide.

To achieve the above and/or other aspects, one or more embodiments may include a cathode including: the cathode active material; a conductive agent; and a binder.

To achieve the above and/or other aspects, one or more embodiments may include a lithium battery comprising the cathode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

A cathode active material according to an exemplary embodiment includes a lithium composite oxide represented by Formula 1 (hereinafter, referred to as the lithium composite oxide) and a lithium titanium oxide represented by Formula 2 (hereinafter, referred to as the lithium titanium oxide, or the reduced lithium titanium oxide). Specifically, the lithium titanium oxide is prepared using a reduction process and has an average oxidation number of 4-w (0<w<2):

[Formula 1]

where M is Mn, Zr, Ti, Mo, Zn, or a combination thereof; M' is Ni, Co, Mn, Cr, Fe, V, Al, Mg, Ti, Mo, Cu, Zr, B, or a combination thereof; -0.5<x<1; 0<y<1; and 0<z<1;

[Formula 2]

where Me is Al, Zr, Mg, Sn, Si, Ce, Zn, Mo, or a combination thereof; 3<a<8; 4<b+c<7; b≥c; 0≤c<1; and 11<d<13.

The lithium composite oxide is a solid solution having a layered structure. Specifically, the lithium composite oxide is a solid solution of $Li_2MO_3$ and $LiM'O_2$, wherein each of $Li_2MO_3$ and $LiM'O_2$ forms the layered structure. In this case, the amount of $Li_2MO_3$ may be in a range of from about 0.5 to about 99.5 mol %, and the amount of $LiM'O_2$ may be in a range of from about 0.5 to about 99.5 mol %. In the lithium composite oxide, lithium is substituted in a metal layer and may occupy about 20%, or less, of the transition metal sites therein. Such a structure is suitable for a cathode having a high capacity.

In Formula 1, M may be Mn, Zr, Ti, Mo, Zn, or a combination thereof, for example Mn, Zr, Ti, Mo, or a combination thereof. M' may be Ni, Co, Mn, Cr, Fe, V, Al, Mg, Ti, Mo, Cu, Zr, B, or a combination thereof, for example Ni, Co, Mn, Cr, Fe, V, Al, Mg, Ti, Mo, or a combination thereof. In Formula 1, 0<z<1, for example 0<z<0.8. If 0<z<0.8, the electrical conductivity is not likely to be reduced.

The lithium composite oxide can be prepared by solidification. For example, the lithium composition oxide may be prepared by sintering a mixture of a lithium source material and a metal-containing source material.

Also, the lithium composite oxide can be prepared by using a polymer chelating method. For example, a lithium source material and a metal-containing source material may be dissolved in an acidic aqueous solution, to form a sol, and then the sol is dried to form a gel. Then, the gel is combusted and a heat treatment process is performed thereon, to obtain a lithium composite oxide powder.

In addition, the lithium composite oxide can be prepared by co-precipitation. For example, a lithium source material and a metal-containing material may be mixed in a predetermined equivalent ratio, in a solvent. The solvent may be ethanol, methanol, water, or acetone. The obtained mixture is heat-treated at a temperature in a range of from about 400 to about 600° C., to prepare a lithium composite oxide. In some cases, the lithium composite oxide can be further heat-treated at a temperature in a range of from about 700 to about 1000° C.

The lithium source material may be lithium carbonate, lithium acetate, or lithium hydroxide, but is not limited thereto. The metal-containing source material may be acetate, nitrate, hydroxide, or oxide, each of which includes metals corresponding to M and M' in Formula 1. However, the metal-containing source material can also include other materials.

Due to the presence of lithium in the metal layer of the lithium composite oxide, the amount of metal elements affecting electrical conductivity, such as Ni, or Co, is decreased, and thus, the electrical conductivity thereof is reduced. The present exemplary embodiment considers the suppression of a decrease in electrical conductivity caused by the lithium composite oxide having the layered structure.

Lithium batteries are generally charged with a high voltage of at least 4.5 V (vs. Li), to obtain a high capacity. However, at about 4.5 V, oxygen is released from a lattice structure of the lithium composite oxide. Thus, an electrolyte side reaction occurs, and the lattice structure of the lithium composite oxide deteriorates. Accordingly, battery cycle-life and charge/discharge efficiency may be reduced. Therefore, stability improvements at a high voltage, also should be taken into account.

To simultaneously suppress a decrease in electrical conductivity and improve stability at a high voltage, the reduced lithium titanium oxide represented by Formula 2 is mixed with the lithium composite oxide, to form the cathode active material. In the lithium titanium oxide represented by Formula 2, 3<a<8, 4<b+c<7, b≥c, 0≤c<1, and 11<d<13, for example 3<a<5, 4.5<b+c<5.5, b≥c, 0≤c<0.5, and 11<d<13.

According to the ranges of a through d, Me may not exist in the lithium titanium oxide, or Ti may be partially substituted with Me. In the latter case, the amount of Me may be about 50 mol %, or less, for example from about 1 to 10 mol %, based on the total amount of Me and Ti. Me may be Al, Zr, Mg, Sn, Si, Ce, Zn, Mo, or a combination thereof.

Since the lithium titanium oxide can exchange $H^+$ ions, the lithium titanium oxide captures $H^+$ ions generated from moisture in the electrolyte, in an electrode. Thus, $H^+$ ions in the electrode can be reduced. Also, the use of the lithium titanium oxide stabilizes the charges of a lithium composite oxide that has lost lithium during charging/discharging, and suppresses the release of oxygen. As a result, the lattice structure can be stably maintained during charging. Thus, the electrode is stabilized.

In the present exemplary embodiments, the conductivity of the lithium titanium oxide is compensated using a reduction process. The reduction process may include a heat treatment process performed under a reduction atmosphere, such as an $H_2$ atmosphere, an $H_2$-containing mixed atmosphere, or an $NH_3$ atmosphere.

The $H_2$-containing mixed reduction atmosphere includes from about 1 to about 80 volume % of $H_2$ and from about 20 to about 99 volume % of $N_2$ or Ar. For example, the $H_2$-containing mixed reduction atmosphere may include from about 4 to about 70 volume % of $H_2$ and from about 30 to about 96 volume % of $N_2$ or Ar. If the reduction process is performed using the gaseous mixture including from about 1 to about 80 volume % of $H_2$ and from about 20 to about 99 volume % of $N_2$ or Ar, an excellent reduction effect can be obtained, and an explosion may be prevented.

If the heat treatment process is performed under an $NH_3$ reduction atmosphere, a nitride layer, such as titanium nitride (TiN), or titanium oxynitride (TiON), may be formed on a surface of particles of the lithium titanium oxide. The nitride layer may partially or completely cover the lithium titanium oxide particles.

Since the nitride layer is conductive, a lithium battery using the lithium titanium oxide that is prepared by performing the heat treatment process under the $NH_3$ reduction atmosphere may have excellent electrical conductivity. In the lithium titanium oxide that is prepared by performing a heat treatment process under the $H_2$, the $H_2$-containing gaseous mixture, or the $NH_3$ reduction atmosphere, an average oxidation number of titanium may be 4-w (0<w<2).

The increase in electrical conductivity resulting from the reduction process will now be described. For example, for a Ti-based oxide, when an oxidation number is 4+, as shown in $TiO_2$ (Ti $3d^0$), electrons do not exist in a d-band. Thus, insulating characteristics may be realized. However, when reduced to be TiO (Ti $3d^2$), two electrons exist in the d-band. Thus metallic conductivity may be realized. Accordingly, a cathode active material, including the lithium titanium oxide that is prepared by performing a heat treatment process in a reduction atmosphere, has excellent electrical conductivity.

For the lithium titanium oxide that is prepared by performing a heat treatment process under an $H_2$ or an $H_2$-containing gaseous mixture reduction atmosphere, the binding energy of the titanium is in a range of from 456.00 to 458.00 eV (when measured by an XPS analysis). In this case, the conductivity of the lithium titanium oxide is substantially improved, and thus, a battery having excellent electrical conductivity can be realized.

In addition, as described above, if the heat treatment process is performed under an $NH_3$ reduction atmosphere, a nitride layer, such as titanium nitride (TiN), or titanium oxynitride (TiON), may be formed on the surfaces of the lithium titanium oxide particles. In this case, the binding energy of the nitride is in a range of from about 455.00 to about 458.00 eV (when measured by an XPS analysis). In this case, the conductivity of the lithium titanium oxide is substantially improved, and thus, a battery having excellent electrical conductivity can be realized.

The color of the lithium titanium oxide is changed after the reduction process. Such a change is illustrated in FIGS. 1A to 1C.

Figure 1A:
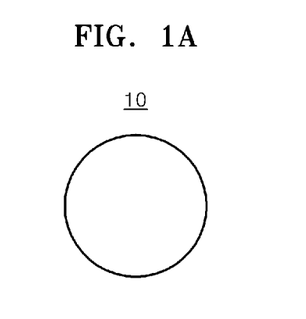
FIG. 1A is a diagram of a lithium titanium oxide particle that is not reduced.
Figure 1B:
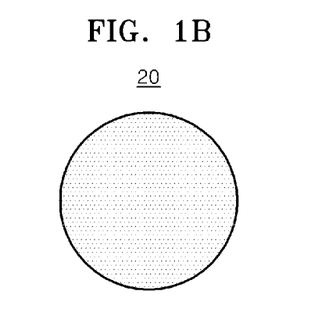
FIG. 1B is a diagram of a lithium titanium oxide particle that is reduced in a $H_2$ atmosphere, or an $H_2$-containing gaseous mixture atmosphere, according to an exemplary embodiment.

FIG. 1A is a diagram of a lithium titanium oxide particle 10 that is not reduced. The lithium titanium oxide particle 10 is white in color. FIG. 1B is a diagram of a lithium titanium oxide particle 20 that is reduced under an $H_2$ atmosphere, or an $H_2$-containing mixed atmosphere, according to an exemplary embodiment. Referring to FIG. 1B, the lithium titanium oxide particle 20 has the same general structure as the lithium titanium oxide particle 10, but is dark blue in color.

Figure 1C:
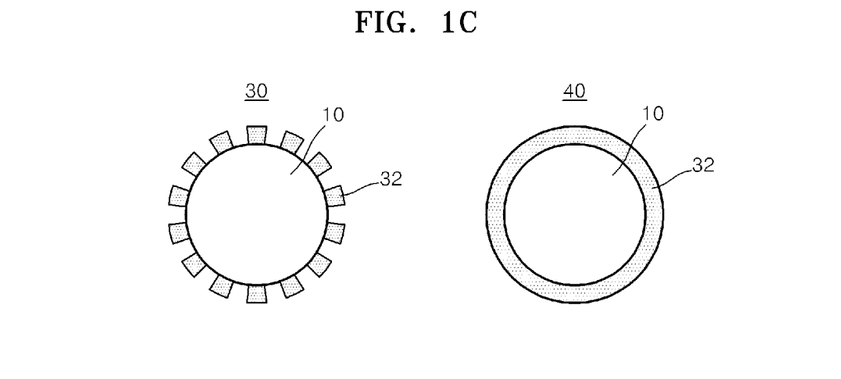
FIG. 1C is a diagram of lithium titanium oxide particles which are reduced in an $NH_3$ atmosphere, according to an exemplary embodiment.

FIG. 1C is a diagram of lithium titanium oxide particles 30 and 40 that are reduced under an $NH_3$ atmosphere, according to another exemplary embodiment. Referring to FIG. 1C, a nitride layer 32 is formed on a portion of the surface of the lithium titanium oxide particle 10. For the lithium titanium oxide particle 40, a nitride layer 32 is formed on the entire surface of the lithium titanium oxide particle 10. Due to the reduction process, the nitride layer 32 becomes dark blue in color.

As described above, whether the lithium titanium oxide is reduced can be identified by comparing the color of the lithium titanium oxide, before and after the reduction process, and the resultant electrical conductivity effect can also be predicted. The heat treatment may be performed at a temperature ranging from about 500 to about 1000° C., for example, from about 900 to about 1000° C.

After being reduced, the lithium titanium oxide may be used together with, or coated on, the lithium composite oxide. When the reduced lithium titanium oxide is coated on particles of the lithium composite oxide, the lithium titanium oxide may be fixed to the surfaces of the lithium composite oxide particles, to form the cathode active material. In this case, fixing refers to the fact that, when the cathode active material is stirred in water or an organic solvent, the lithium titanium oxide is not separated from the lithium composite oxide.

The lithium titanium oxide may be uniformly coated on the entire surface, or a portion of the surface, of the lithium composite oxide. Since the lithium titanium oxide is uniformly coated on the lithium composite oxide particle, the lithium titanium oxide acts as a buffer when lithium ions migrate from an anode to a cathode. In addition, the crystal structure thereof is prevented from collapsing, and thus, the cycle-life characteristics may be improved. In addition, during charging/discharging, the charges of a lithium composite oxide that has lost lithium are stabilized, and the release of oxygen is suppressed. Thus, the crystal structure can be stabilized.

A method of coating the lithium titanium oxide on the lithium composite oxide is not particularly limited. According to an exemplary embodiment, the lithium composite oxide and lithium titanium oxide, or precursors thereof, may be mixed and then heat-treated, to attach the lithium titanium oxide to particles of the lithium composite oxide. According to another exemplary embodiment, lithium titanium oxide powder is mechanically compressed with lithium composite oxide particles, thereby physically attaching the lithium titanium oxide to the lithium composite oxide particles. According to another exemplary embodiment, the lithium titanium oxide is precipitated on the surfaces of lithium composite oxide particles, using a wetting method, such as a sol-gel method. Heat-treating conditions described above, including the sintering temperature, time, and atmosphere, are not particularly limited and may be appropriately determined.

When the reduced lithium titanium oxide is used together with the lithium composite oxide, or when the lithium composite oxide is coated on the lithium titanium oxide, the amount of the reduced lithium titanium oxide may be in a range of from about 0.1 to about 5 weight %, for example from about 0.1 to about 3 weight %, based on the total weight of the reduced lithium titanium oxide and the lithium composite oxide. The amount of the lithium composite oxide may be in a range of from about 95 weight % to about 99.9 weight %, for example from about 97 to about 99.9 weight %, based on the total weight of the reduced lithium titanium oxide and the lithium composite oxide. If the reduced lithium titanium oxide and the lithium composite oxide are within these ranges, the charge/discharge efficiency is increased, and the cycle-life is lengthened.

Since the cathode active material includes the lithium composite oxide and the reduced lithium titanium oxide, as described above, when used in a lithium battery, the lithium composite oxide does not contact an electrolyte, and thus, the lithium composite oxide does not decompose the electrolyte, and cycle-life characteristics may be substantially improved. In addition, since the lithium titanium oxide is reduced, a decrease in electrical conductivity is prevented, and charge/discharge efficiency and battery cycle-life are increased.

Lithium batteries are classified into lithium ion batteries, lithium ion polymer batteries and lithium polymer batteries, according to a separator and electrolyte used in the lithium batteries. Lithium batteries are also classified into cylindrical lithium batteries, rectangular lithium batteries, coin-type lithium batteries, and pouch-type lithium batteries, according to the shape thereof. Lithium batteries are further classified into bulky lithium batteries and thin lithium batteries, according to the size thereof. Lithium batteries are also classified into primary batteries and secondary batteries, according to a charging method. The lithium battery according the present exemplary embodiments may be any of the batteries described above. Since the structures of these batteries and the methods of manufacturing these batteries are well known in the art, detailed descriptions thereof are not provided.

Figure 2:
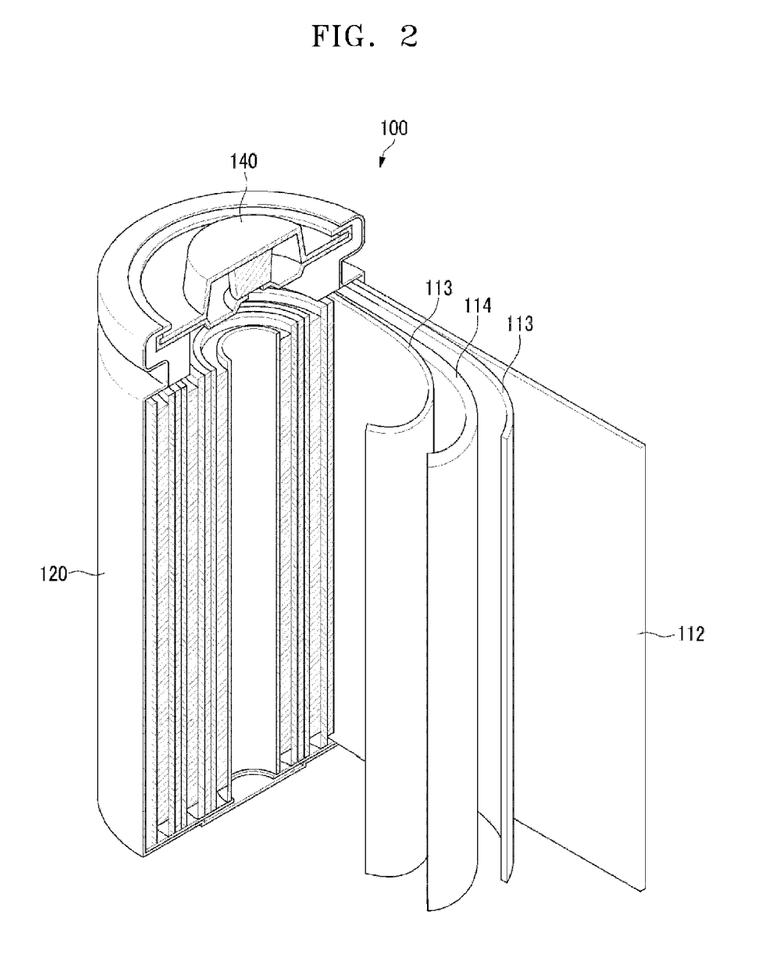
FIG. 2 is a schematic perspective view of a lithium battery, according to an exemplary embodiment.

FIG. 2 is a schematic perspective view of a lithium battery 100, according to an exemplary embodiment. Referring to FIG. 2, the lithium battery 100 is cylindrical and includes an anode 112, a cathode 114, a separator 113 disposed there between, an electrolyte (not shown), a battery container 120, and a sealing member 140 to seal the battery container 120. The anode 112, the cathode 114, and the separator 113 are sequentially stacked, wound in a spiral shape, and then inserted into the battery container 120 along with the electrolyte, thereby completing the manufacture of the lithium battery 100.

Figure 3:
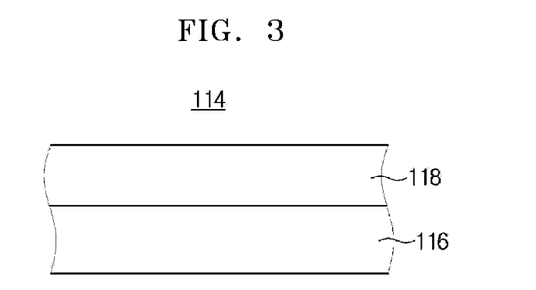
FIG. 3 is a schematic cross-sectional view of a cathode that is used in a lithium battery, according to an exemplary embodiment.

FIG. 3 is a schematic cross-sectional view of the cathode 114 of the lithium battery 100. Referring to FIG. 3, the cathode 114 includes a collector 116 and a cathode active material layer 118 disposed on the collector 116. The cathode active material layer 118 includes the cathode active material described above, a conductive agent, and a binder. According to a method of manufacturing the cathode 114, the cathode active material, the conductive agent, the binder, and a solvent are mixed, to prepare a cathode active material composition. The cathode active material composition is coated on the collector 116 and then dried to complete the manufacture of the cathode 114. In the alternative, the cathode active material composition is cast on a separate support, and a film separated from the separate support is laminated on the collector 116, to complete the manufacture of the cathode 114.

Amounts of the cathode active material, the conductive agent, and the binder may be, respectively, in a range of from about 80 to about 98 weight %, from about 1 to about 10 weight %, and from about 1 to about 10 weight %. For example, the amounts of the cathode active material, the conductive agent, and the binder may be, respectively, in a range of from, about 85 to about 95 weight %, from about 1 to about 7 weight %, and from about 1 to about 7 weight %, based on the total weight of the cathode active material, the conductive agent, and the binder. When the amounts of the cathode active material, the conductive agent, and the binder are within these ranges, the cathode 114 may have high energy density per unit volume.

For the cathode active material described above, the amount of the reduced lithium titanium oxide may be in a range of from about 0.1 to about 10 weight %, for example, from about 0.1 to about 5 weight %, based on the total weight of the cathode active material, the conductive agent, and the binder. If the amount of the reduced lithium titanium oxide is in a range of from about 0.1 to about 10 weight %, the decrease in electrical conductivity is suppressed, and the charge/discharge efficiency and the battery-life are increased.

The conductive material is used to provide conductivity to the cathode 114. The conductive material may be any electron conducting material that does not undergo a chemical change in a battery. The conductive material may include at least one conducting material selected from the group consisting of natural graphite, artificial graphite, carbon black, acetylene black, ketjen black, carbon fiber, a polyphenylen derivative, and a metal powder or fiber of copper, nickel, aluminum, or silver.

The binder may attach cathode active material particles to each other and to the collector 116. Examples of the binder include polyvinylalcohol, carboxymethylcellulose, hydroxypropylcellulose, diacetylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon. However, the binder is not limited thereto.

The solvent may be N-methylpyrrolidone (NMP), acetone, water, or the like. The collector 116 may be any material selected from the group consisting of a copper film, a nickel film, a stainless film, a titanium film, a nickel foam, a copper foam, and a conductive material-coated polymer substrate. In addition, the collector 116 may be formed of aluminum, which is inexpensive and lightweight, copper, or an alloy of aluminum and copper. In particular, the collector 116 may be formed of aluminum.

Like the method of manufacturing the cathode 114, according to a method of manufacturing the anode 112 of the lithium battery 100, an anode active material, a conductive agent, a binder, and a solvent are mixed, to prepare an anode active material composition. Then the anode active material composition is directly coated on a collector and dried, to complete the manufacture of the anode 112. In the alternative, the anode active material composition is cast on a separate support, and a film separated from the separate support is laminated on a collector, to complete the manufacture of the anode 112.

The amounts of the anode active material, the conductive agent, and the binder may be the same as those of the cathode active material, the conductive agent, and the binder used to manufacture the cathode 114. The anode active material may be a carbonaceous material that reversibly intercalates lithium ions, lithium metal, an alloy of lithium metal, a material used to dope or de-dope lithium, or a transition metal oxide.

The carbonaceous material that reversibly intercalates lithium ions may be any carbonaceous anode active material that is conventionally used in secondary batteries. Examples of the carbonaceous material include crystalloid carbon, amorphous carbon, and a mixture thereof. Examples of the crystalloid carbon include amorphous, platy, flake-like, circular, and fiber-type natural graphite or artificial graphite. Examples of the amorphous carbon include soft carbon (lowtemperature calcination carbon) or hard carbon, mesophase pitch carbonates, and sintered coke. The alloy of lithium metal may be an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material used to dope or de-dope lithium includes Si; $SiO_x$ (0<x<2); a Si—Y alloy where Y is not Si and is an element selected from the group consisting of alkali metal, alkali earth metal, Group 13 elements, Group 14 elements, transition metal, rare-earth elements and a combination thereof; Sn; $SnO_2$; and an Sn—Y alloy where Y is not Sn and is an element selected from the group consisting of alkali metal, alkali earth metal, Group 13 elements, Group 14 elements, transition metal, rare-earth elements and a combination thereof. For example, Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide and lithium vanadium oxide. The conductive agent, the binder, the solvent, and the collector used to manufacture the anode 112 may be the same as the conductive agent, the binder, the solvent, and the collector 116 used to manufacture the cathode 114. The electrolyte of the lithium battery 100 may include a non-aqueous organic solvent and a lithium salt.

The non-aqueous organic solvent may act as a medium through which ions participating in an electrochemical reaction of the lithium battery 100 are transferred. The non-aqueous organic solvent may be a carbonate-based solvent, an ester-based solvent, an ether-based solvent, a ketone-based solvent, an alcohol-based solvent, or an aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of the ester-based solvent include methyl acetate, ethyl acetate, n-propyl acetate, dimethylacetate, methylpropionate, ethylpropionate, γ-butyrolactone, decanolide, valerolactone, mevalonolactone, and caprolactone. Examples of the ether-based solvent include dibutylether, tetraglyme, diglyme, dimethoxyethane, 2-methyltetrahydrofurane, and tetrahydrofurane. Examples of the ketone-based solvent include cyclohexanone. Examples of the alcohol-based solvent include ethylalcohol and isopropyl alcohol. Examples of the aprotic solvent include: nitriles such as R—CN, where R is a linear, branched, or cyclic C2 to 20 hydrocarbon group and has a double-bond direction ring or ether bond; amides such as dimethylformamide; and dioxolane-based sulfolanes such as a 1,3-dioxolane sulfolane.

These non-aqueous organic solvents may be used alone or in combination. If the non-aqueous organic solvents are used in combination, the mixture ratio may be appropriately controlled, according to a desired battery performance, and may be obvious to one of ordinary skill in the art.

The carbonate-based solvent may be a mixture of a cyclic carbonate and a chain carbonate. In this case, the volume ratio of the cyclic carbonate and the chain carbonate may be in a range of from about 1:1 to about 1:9, to obtain excellent electrolytic performance.

The non-aqueous organic solvent may include, in addition to the carbonate-based solvent, an aromatic hydrocarbon-based organic solvent. In this case, the volume ratio of the carbonate-based solvent to the aromatic hydrocarbon-based organic solvent may be in a range of from about 1:1 to about 30:1. The aromatic hydrocarbon-based organic solvent may be an aromatic hydrocarbon-based compound represented by Formula 3:

[Formula 3]

where $R_1$ to $R_6$ are, each independently, hydrogen, halogen, a C1-C10 alkyl group, a haloalkyl group, or a combination thereof.

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous organic solvent may further include vinylene carbonate or an ethylene carbonate-based compound represented by Formula 4, to increase the battery lifetime:

[Formula 4]

where $R_7$ and $R_8$ are, each independently, hydrogen, a halogen group, a cyano group (CN), a nitro group ($NO_2$) and a C1-C5 fluoridated alkyl group; at least one of $R_7$ and $R_8$ is selected from the group consisting of hydrogen, a halogen group, a cyano group (CN), a nitro group ($NO_2$), and a C1-C5 fluoridated alkyl group; wherein $R_7$ and $R_8$ are not both hydrogen.

Examples of the ethylene carbonate-based compound include difluoro ethylenecarbonate, chloroethylene carbonate, dichloroethylene carbonate, boromoethylene carbonate, diboromoethylene carbonate, nitroethylene carbonate, cyanoethylene carbonate and fluoroethylene carbonate. The amount of the ethylene carbonate-based compound may be appropriately controlled.

The lithium salt is dissolved in an organic solvent, acts as a lithium ion supplier in a lithium battery, and promotes the movement of the lithium ions between the cathode and the anode. The lithium salt may include at least one supporting electrolytic salt selected from the group consisting of $LiPF_6$, LiBF$_4$, LiSbF$_6$, LiAsF$_6$, LiN(SO$_2$C$_2$F$_5$)$_2$, Li(CF$_3$SO$_2$)$_2$N, LiN(SO$_3$C$_2$F$_5$)$_2$, LiC$_4$F$_9$SO$_3$, LiClO$_4$, LiAlO$_2$, LiAlCl$_4$, LiN (C$_x$F$_{2x+1}$SO$_2$)(C$_y$F$_{2y+1}$SO$_2$) (where x and y are natural numbers), LiCl, LiI, and LiB(C$_2$O$_4$)$_2$ [lithium bis(oxalato) borate; LiBOB]. The concentration of the lithium salt may be in a range of from about 0.1 to 2.0 M. If the concentration of the lithium salt is within this range, the electrolyte may have appropriate levels of conductivity and viscosity, and thus, has excellent electrolytic performance, and lithium ions may effectively be transported.

The separator 113 of the lithium battery 100 may include a polyethylene single layer, a polypropylene single layer, a polyvinylidene fluoride single layer, a combination thereof, a polyethylene/polypropylene double-layered structure, a polyethylene/polypropylene/polyethylene triple-layered structure, or a polypropylene/polyethylene/polypropylene triple-layered structure.

Hereinafter, the present teachings will be described in more detail, with reference to the following examples. However, these examples are for illustrative purposes only and are not intended to limit the scope of the present invention. In addition, some information that is technically obvious to one of ordinary skill in the art is not described.

Example 1

A hydroxide of Ni$_{0.2}$Co$_{0.08}$Mn$_{0.48}$ was mixed with Li$_2$CO$_3$ and ammonium molybdate, to prepare a slurry. The amounts of the Li$_2$CO$_3$ and ammonium molybdate were controlled, according to a target composition ratio of lithium composite oxide. The slurry was completely dried and then heat-treated at 950° C. for 5 hours, to prepare a lithium composite oxide powder. The chemical formula of the lithium composite oxide powder, which was prepared by co-precipitation as described above, was Li$_{1.2}$Ni$_{0.2}$Co$_{0.08}$Mn$_{0.48}$Mo$_{0.04}$O$_2$.

Li$_4$Ti$_5$O$_{12}$ having an average particle size of 50 nm was heat-treated at 700° C., under an H$_2$/N$_2$ (5 volume % of H$_2$ and 95 volume % of N$_2$) reduction atmosphere, for one hour, and then the resultant product was added to the lithium composite oxide powder, to prepare a cathode active material. In the cathode active material, the amount of the lithium composite oxide powder was 98.9 weight %, and the amount of the Li$_4$Ti$_5$O$_{12}$ that was reduced was 1.1 weight %.

The cathode active material and a conductive agent (acetylene black) were uniformly mixed at a weight ratio of 94:3, and then a binder (5 weight % of polyvinylidenefluoride dissolved in an N-methylpyrrolidone (PVDF) binder solution) was added thereto, to prepare a slurry including the cathode active material, the conductive agent, and the binder, in a mixed weight ratio of 93:3:4, respectively. The resultant slurry was coated on an aluminum foil having a thickness of 15 μm and dried to prepare a cathode, and the cathode was then vacuum dried. The cathode and a counter electrode (metal lithium) were used to manufacture a coin type half-cell. Then, a charge/discharge test was performed on the coin type half-cell. An electrolyte used in the coin type half-cell was 1.3M LiPF$_6$ dissolved in a mixed solvent of ethylenecarbonate (EC) and dimethylcarbonate (DMC), at a volume ratio of 3:7, respectively.

Example 2

A coin type half-cell was manufactured in the same manner as in Example 1, except that 97.8 weight % of lithium composite oxide powder and 2.2 weight % of reduced Li$_4$Ti$_5$O$_{12}$ were used to prepare the cathode active material.

Example 3

Li$_4$Ti$_5$O$_{12}$ having an average particle size of 50 nm was heat-treated at 700° C., under a NH$_3$ reduction atmosphere, for one hour, and then added to the lithium composite oxide powder prepared in Example 1, thereby preparing a cathode active material. In this case, a nitride layer was formed on the reduced Li$_4$Ti$_5$O$_{12}$. In the cathode active material, the amount of the lithium composite oxide powder was 98.9 weight %, and the amount of the reduced Li$_4$Ti$_5$O$_{12}$ was 1.1 weight %. A coin type half-cell was manufactured using the cathode active material, in the same manner as in Example 1.

Example 4

A coin type half-cell was manufactured in the same manner as in Example 3, except that 97.8 weight % of lithium composite oxide powder and 2.2 weight % of reduced Li$_4$Ti$_5$O$_{12}$ were used to prepare the cathode active material.

Comparative Example 1

A hydroxide of Ni$_{0.2}$Co$_{0.08}$Mn$_{0.48}$ was mixed with Li$_2$CO$_3$ and ammonium molybdate, to prepare a slurry. The amounts of the Li$_2$CO$_3$ and ammonium molybdate were controlled according to a target composition ratio of lithium composite oxide. The slurry was completely dried and then heat-treated at 950° C., for 5 hours, to prepare a lithium composite oxide powder. The chemical formula of the lithium composite oxide powder, prepared by co-precipitation as described above, was Li$_{1.2}$Ni$_{0.2}$Co$_{0.08}$Mn$_{0.48}$Mo$_{0.04}$O$_2$ The lithium composite oxide powder was used as a cathode active material.

The cathode active material and a conductive agent (acetylene black) were uniformly mixed at a weight ratio of 94:3, and then a binder (5 weight % of polyvinylidenefluoride dissolved in an N-methylpyrrolidone (PVDF) binder solution) was added thereto, to prepare a slurry including the cathode active material, the conductive agent, and the binder, at a mixed weight ratio of 93:3:4, respectively. The resultant slurry was coated on an aluminum foil having a thickness of 15 μm and then dried to prepare a cathode. The cathode was then vacuum dried. The cathode and a counter electrode (metal lithium) were used to manufacture a coin type half-cell. Then, a charge/discharge test was performed on the coin type half-cell. An electrolyte used in the coin type half-cell was 1.3M LiPF$_6$, which was dissolved in a mixed solvent of ethylenecarbonate (EC) and dimethylcarbonate (DMC), at a volume ratio of 3:7, respectively.

Comparative Example 2

Li$_4$Ti$_5$O$_{12}$ having an average particle size of 50 nm was added to the lithium composite oxide powder prepared according to Comparative Example 1, to prepare a cathode active material. In this case, the amount of the lithium composite oxide powder was controlled to be 98.9 weight %, and the amount of the Li$_4$Ti$_5$O$_{12}$ was controlled to be 1.1 weight %. A coin type half-cell was manufactured using the cathode active material, in the same manner as in Comparative Example 1.

Comparative Example 3

Li$_4$Ti$_5$O$_{12}$ having an average particle size of 50 nm was added to the lithium composite oxide powder prepared in Comparative Example 1, to prepare a cathode active material. In this case, the amount of the lithium composite oxide powder was controlled to be 97.8 weight %, and the amount of the $Li_4Ti_5O_{12}$ was controlled to be 2.2 weight %. A coin type half-cell was manufactured using the cathode active material, in the same manner as in Comparative Example 1.

Comparative Example 4

$Li_4Ti_5O_{12}$ having an average particle size of 50 nm was heat-treated at 700° C. under an ambient condition, for one hour, and then added to the lithium composite oxide powder prepared in Comparative Example 1, to prepare a cathode active material. In this case, the amount of the lithium composite oxide powder was controlled to be 98.9 weight %, and the amount of the $Li_4Ti_5O_{12}$ was controlled to be 1.1 weight %. A coin type half-cell was manufactured using the cathode active material, in the same manner as in Comparative Example 1.

X-Ray Photoelectron Spectroscopy (XPS) Analysis Results

Figure 4:
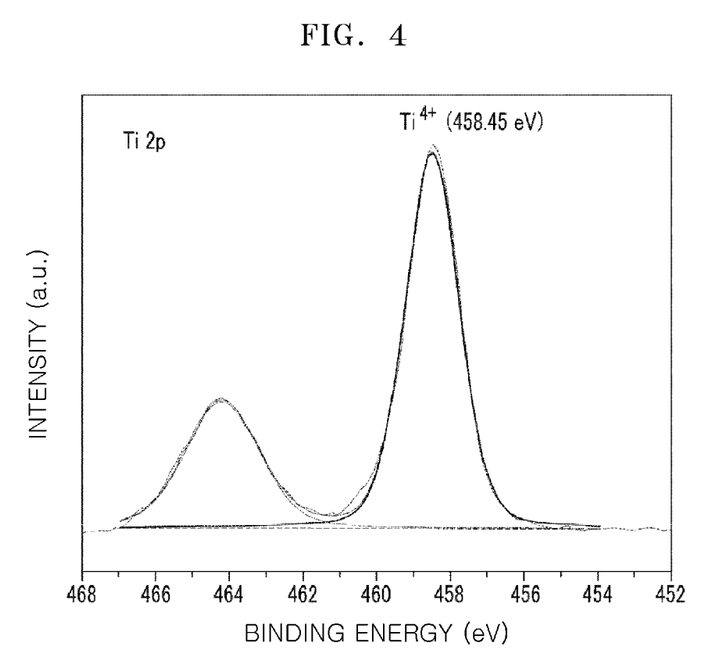
FIG. 4 is a graph showing Ti 2p XPS analysis results of $Li_4Ti_5O_{12}$ used in Comparative Examples 2 and 3.

FIG. 4 is a graph showing Ti 2p XPS analysis results of the $Li_4Ti_5O_{12}$ used in Comparative Examples 2 and 3. Referring to FIG. 4, a peak of $Ti^{4+}$ appeared, and the corresponding binding energy was 458.45 eV.

Figure 5:
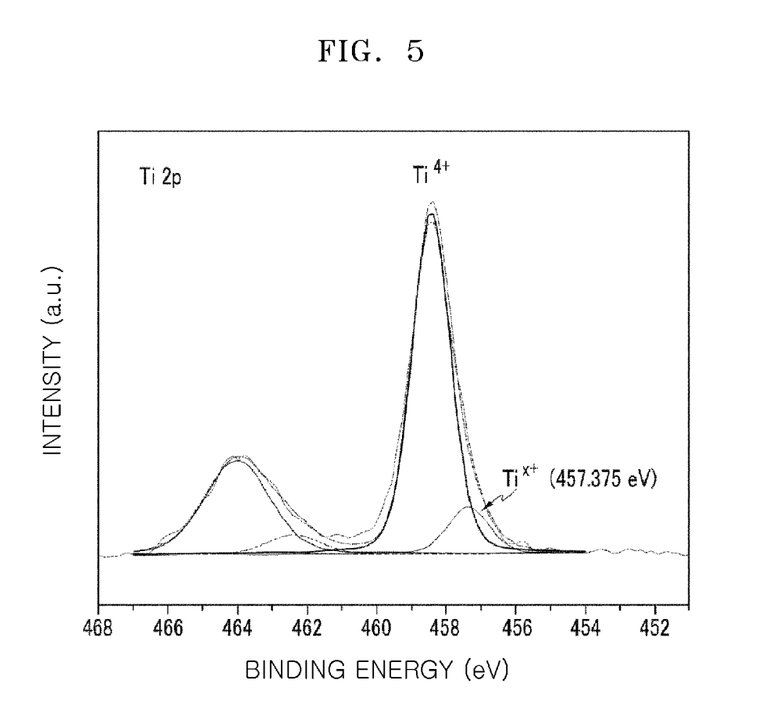
FIG. 5 is a graph showing Ti 2p XPS analysis results of $Li_4Ti_5O_{12}$ manufactured according to Examples 1 and 2, wherein the $Li_4Ti_5O_{12}$ was reduced in an $H_2/N_2$ atmosphere.

FIG. 5 is a graph showing Ti 2p XPS analysis results of the $Li_4Ti_5O_{12}$ manufactured according to Examples 1 and 2, wherein the $Li_4Ti_5O_{12}$ was reduced under an $H_2/N_2$ atmosphere. Referring to FIG. 5, another peak that had a lower binding energy than $Ti^{4+}$ appeared. That is, as illustrated in FIG. 4, the binding energy of the $Ti^{4+}$ was 458.45 eV, but as illustrated in FIG. 5, the newly found peak of the $Ti^{x+}$, where $2<x<4$ had a binding energy of 457.375 eV. That is, the binding energy of the $Ti^{x+}$ was less than that of the $Ti^{4+}$, by about 1 eV. Such decrease in the binding energy indicates that Ti was partially reduced. In the $Ti^{x+}$, x is an average oxidation number of titanium and is 4-w, where $0<w<2$.

Figure 6:
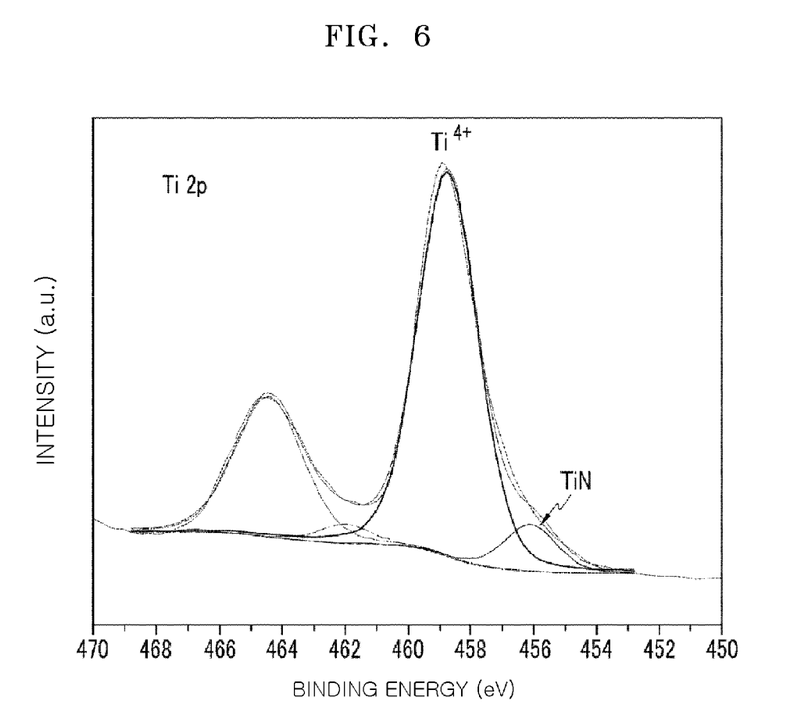
FIG. 6 is a graph showing Ti 2p XPS analysis results of $Li_4Ti_5O_{12}$ manufactured according to Examples 3 and 4, wherein the $Li_4Ti_5O_{12}$ was reduced in an $NH_3$ atmosphere.

FIG. 6 is a graph showing Ti 2p XPS analysis results of the $Li_4Ti_5O_{12}$ manufactured according to Examples 3 and 4, wherein the $Li_4Ti_5O_{12}$ was reduced under an $NH_3$ atmosphere. Referring to FIG. 6, another peak that having a lower binding energy than $Ti^{4+}$ appeared. That is, as illustrated in FIG. 4, the binding energy of the $Ti^{4+}$ was 458.45 eV, but the newly found peak illustrated in FIG. 5, that is, a TiN nitride layer formed on $Li_4Ti_5O_{12}$, had a binding energy of 456.00 eV. That is, the binding energy of the $Ti^{x+}$ was less than that of the TiN nitride layer, by about 2.5 eV. Such decrease in the binding energy indicates that Ti was partially reduced.

In addition, the color of the $Li_4Ti_5O_{12}$ powder particle changed from white to dark blue, after a reduction process. The change in color indicates that the $Li_4Ti_5O_{12}$ powder particles can absorb light energy in a visible light region, and thus, it can be presumed that conductivity was improved.

As described above, by referring to FIGS. 4-6, when lithium titanium oxide that is heat-treated is used together with lithium composite oxide, electrical conductivity was improved.

Battery Performance Evaluation Results

Figure 7:
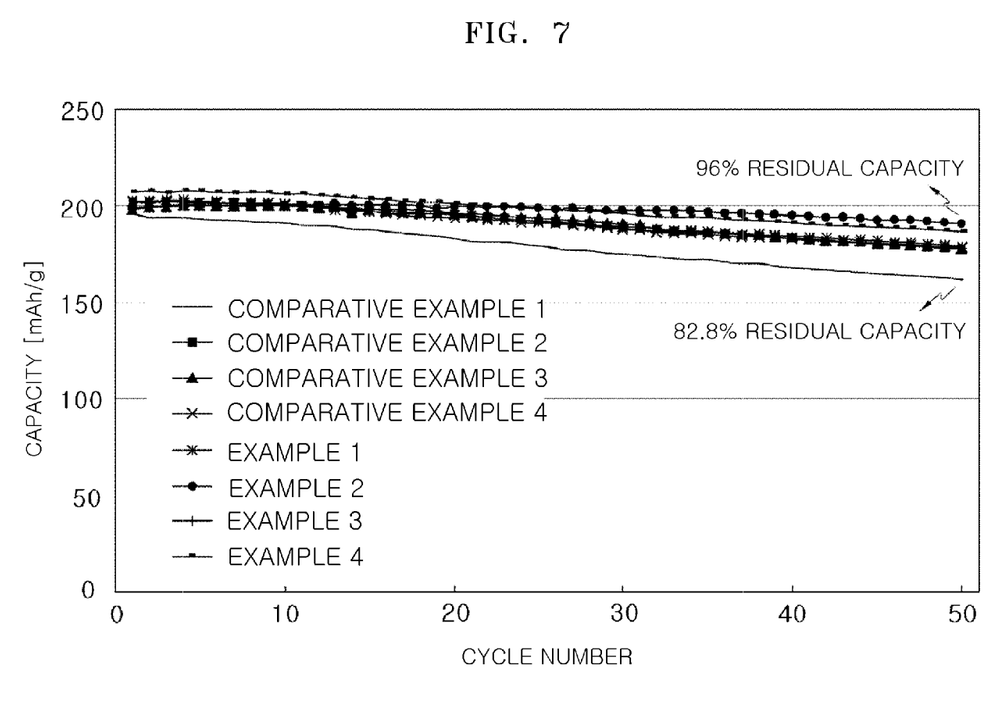
FIG. 7 is a graph of cycle-life characteristics of coin type half-cells manufactured according to Examples 1 through 4 and Comparative Examples 1 through 4.
Figure 8:
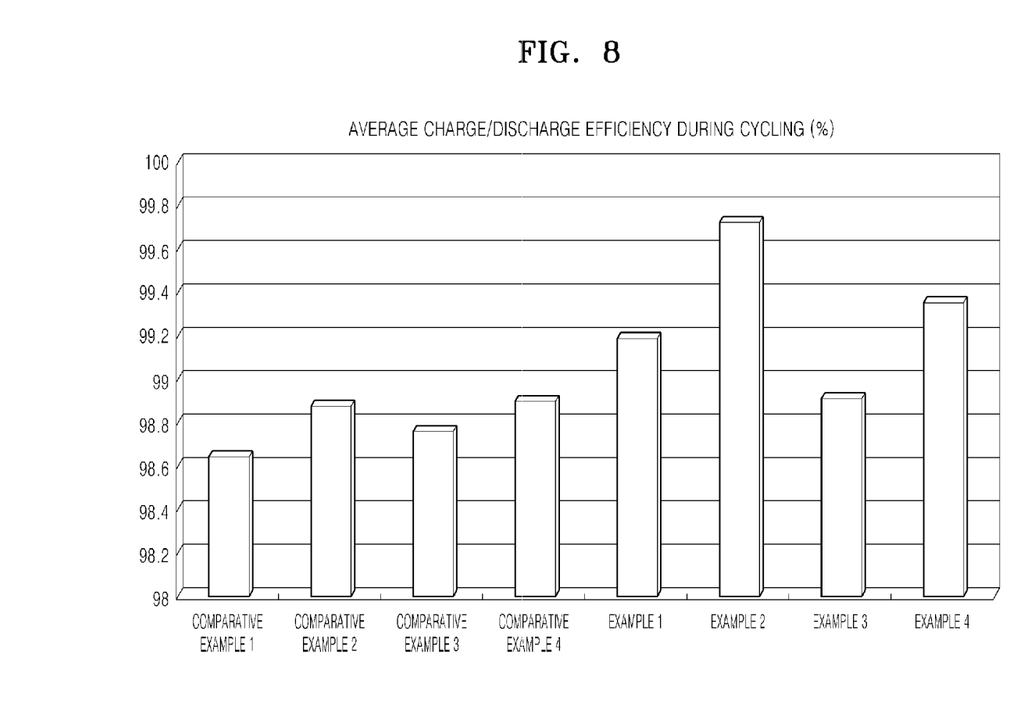
FIG. 8 is a graph of average charge/discharge efficiencies of coin type half-cells manufactured according to Examples 1 through 4 and Comparative Examples 1 through 4.

The performance of the coin type half-cells manufactured according to Examples 1 to 4 and Comparative Examples 1 to 4 was evaluated, and results of cycle-life characteristics and charge/discharge efficiency are shown in FIGS. 7 and 8. To evaluate battery performances, a charge/discharge test was performed.

In a first standard capacity cycle, charging was performed with a constant current of 0.1 C, until the voltage was 4.6 V, and then a constant voltage was applied and maintained until the current was reduced to 0.01 C. Then, discharging was performed with the constant current of 0.1 C, until the voltage was 2 V. In a second standard capacity cycle, charging was performed with the constant current of 0.5 C, until the voltage was 4.55 V, and then a constant voltage was applied and maintained until the current was reduced to 0.01 C. Discharging was performed with the constant current of 0.2 C, until the voltage was 2 V. Finally, the charging and discharging was performed 50 times, and then cycle-life characteristics were evaluated, wherein the charging was performed with the constant current of 0.5 C, until the voltage was 4.55 V and then a constant voltage was applied and maintained until the current reduced to 0.05 C, and discharging was performed with the constant current of 0.2 C, until the voltage was 2 V.

FIG. 7 is a graph of cycle-life characteristics of the coin type half-cells manufactured according to Examples 1 through 4 and Comparative Examples 1 through 4. Referring to FIG. 7, when a small amount of the lithium titanium oxide was used (Comparative Examples 2 to 4), cycle-life characteristics were much improved, as compared to when the lithium titanium oxide was not used at all (Comparative Example 1.) Meanwhile, when the reduced lithium titanium oxide was used (Examples 1 and 3), cycle-life characteristics were similar to when the same amount of lithium titanium oxide that was not reduced (Comparative Example 2), and when the same amount of the reduced lithium titanium oxide that was reduced (Comparative Example 4) was used. Such results show that use of lithium titanium oxide leads to an improvement in high-voltage cycle-life characteristics. In addition, when the reduced lithium titanium oxide (Examples 2 and 4) was used, cycle-life characteristics were improved, compared to when the lithium titanium oxide that was not reduced (Comparative Example 3) was used. Meanwhile, when 2.2 weight % of the reduced lithium titanium oxide (Examples 2 and 4) was used, better cycle-life characteristics were obtained, as compared to when smaller amounts of the reduced lithium titanium oxide (Examples 1 and 3) were used.

FIG. 8 is a graph of the average charge/discharge efficiencies of the coin type half-cells manufactured according to Examples 1 through 4 and Comparative Examples 1 through 4. Referring to FIG. 8, when a small amount of the lithium titanium oxide (Comparative Examples 2 to 4) was used, the average charge/discharge efficiency was improved, as compared to when the lithium titanium oxide was not used at all (Comparative Example 1). In addition, during 50 cycles, the average charge/discharge efficiencies of the reduced lithium titanium oxide (Examples 1 and 3) were 99.2% and 98.9%, respectively, and the average charge/discharge efficiencies of the lithium titanium oxide having the same amount (Comparative Examples 2 and 4) were 98.88% and 98.89%, respectively. This result shows that when a reduction process was performed, higher charge/discharge efficiency can be obtained. Likewise, during 50 cycles, average charge/discharge efficiencies of the reduced lithium titanium oxide (Examples 2 and 4) were 99.7% and 99.33%, respectively, and when an average charge/discharge efficiency of the lithium titanium oxide in the same amount (Comparative Example 3) was 98.75%. This result shows that when a reduction process was performed, higher charge/discharge efficiency can be obtained. Meanwhile, when 2.2 weight % of the lithium titanium oxide (Examples 2 and 4) was used, better cycle-life characteristics could be obtained, as compared to when smaller amounts of lithium titanium oxide (Examples 1 and 3) were used.

Although the average charge/discharge efficiency was evaluated by using half-cells to which lithium is continuously supplied, when a graphite anode is used, the average charge/discharge efficiency difference may be increased. For example, if it is assumed that the charge/discharge efficiency is the same as described above during 50 cycles, the residual capacity in Comparative Example 2 was 56.94%, the residual capacity in Comparative Example 4 was 54.68%, and the residual capacity in Example 1 was 66.92%. Accordingly, when the reduced $Li_4Ti_5O_{12}$ was used, the capacity of a battery was increased by at least 10%, and thus, a long cycle-life battery can be obtained.

As described above, according to the one or more of the above exemplary embodiments, a cathode active material includes a lithium composite oxide and a reduced lithium titanium oxide, and thus, has a high conductivity. Accordingly, a lithium battery cathode including the cathode active material has high capacity, a high electrical conductivity, and during high-voltage charging and discharging, excellent cycle-life characteristics and a high charge/discharge efficiency.

Since more complex portable electronic devices having various functions are continuously being developed, and thus, batteries having higher capacity are needed, the one or more of the above exemplary embodiments may contribute to development of a cathode active material providing a high capacity, and a next generation high-capacity lithium battery including the same.

Although a few exemplary embodiments of the present teachings have been shown and described, it would be appreciated by those skilled in the art that changes may be made in these exemplary embodiments, without departing from the principles and spirit of the invention, the scope of which is defined in the claims and their equivalents.

What is claimed is:
1. A cathode active material, comprising: a lithium composite oxide represented by Formula 1; and a lithium titanium oxide represented by Formula 2; wherein the lithium titanium oxide includes titanium having an average oxidation number of 4-w, where 0<w<2:

Li1+xMyM'0.8-yO2+z,  [Formula 1]

wherein M is Mn, Zr, Ti, Mo, Zn, or a combination thereof; M' is Ni, Co, Mn, Cr, Fe, V, Al, Mg, Ti, Mo, Cu, Zr, B, or a combination thereof; −0.5<x<1; 0<y<0.8; and 0≤z<1; and LiaTibMeeOd,  [Formula 2]

wherein Me is Al, Zr, Mg, Sn, Si, Ce, Zn, Mo, or a combination thereof; 3<a<8; 4<b+c<7; b≥c; 0≤c<1 and 11<d<13,
  wherein the cathode active material includes about 95 weight % to about 99.9 weight % of the lithium composite oxide, and about 0.1 to about 5 weight % of the lithium titanium oxide,
  wherein the lithium titanium oxide is heat-treated under a reduction atmosphere,
  wherein titanium nitride (TiN) or titanium oxynitride (TiON) is formed on the surface of the lithium titanium oxide and wherein the lithium titanium oxide includes titanium having a binding energy in a range of about 456.00 to 458.00 eV, as evaluated by an X-ray photoelectron spectroscopy analysis.
2. The cathode active material of claim 1, wherein the reduction atmosphere is an NH3 containing atmosphere.
3. The cathode active material of claim 1, wherein the heat-treatment is performed at a temperature in a range of about 500 to about 1000° C.
4. The cathode active material of claim 1, wherein the titanium nitride (TiN) or the titanium oxynitride (TiON) has a binding energy in a range of about 455.00 to about 458.00 eV, as evaluated by an X-ray photoelectron spectroscopy analysis.
5. The cathode active material of claim 1, wherein the cathode active material includes about 97 to about 99.9 weight % of the lithium composite oxide, and about 0.1 to about 3 weight % of the lithium titanium oxide.
6. A cathode, comprising:
  the cathode active material of claim 1;
  a conductive agent; and
  a binder.
7. A lithium battery, comprising:
  the cathode of claim 6;
  an anode; and
  a can to house the cathode and the anode.
8. A cathode, comprising:
  the cathode active material of claim 2;
  a conductive agent; and
  a binder.
9. A lithium battery, comprising:
  the cathode of claim 8;
  an anode; and
  a can to house the cathode and the anode.
10. A cathode, comprising:
  the cathode active material of claim 3;
  a conductive agent; and
  a binder.
11. A lithium battery, comprising:
  the cathode of claim 10;
  an anode; and
  a can to house the cathode and the anode.
12. The cathode active material of claim 1, wherein at least one of M or M' is molybdenum.
13. The cathode active material of claim 1, wherein the lithium composite oxide is $Li_{1.2}Ni_{0.2}Co_{0.08}Mn_{0.48}Mo_{0.04}O_2$.
14. The cathode active material of claim 1, wherein the reduction atmosphere is an $NH_3$ atmosphere.
15. The cathode active material of claim 1, wherein titanium oxynitride (TiON) is formed on the surface of the lithium titanium oxide.
16. The cathode active material of claim 2, wherein the lithium titanium oxide is dark blue in color.
17. The cathode active material of claim 1, wherein the titanium nitride (TiN) or titanium oxynitride (TiON) formed on the surface of the lithium titanium oxide is dark blue in color.
18. The cathode active material of claim 1, wherein the lithium titanium oxide is coated on a surface of the lithium composite oxide.
19. The cathode active material of claim 18, wherein the lithium titanium oxide is uniformly coated on an entire surface of the lithium composite oxide.

* * * * *